Sept. 5, 1967 B. A. ARVIDSON 3,339,706
PACKAGE HANDLING MECHANISM
Filed April 21, 1966 5 Sheets-Sheet 1

Inventor:-
Bengt A. Arvidson,
By Hofgren, Wegner, Allen, Stellman & McCord
Attys.

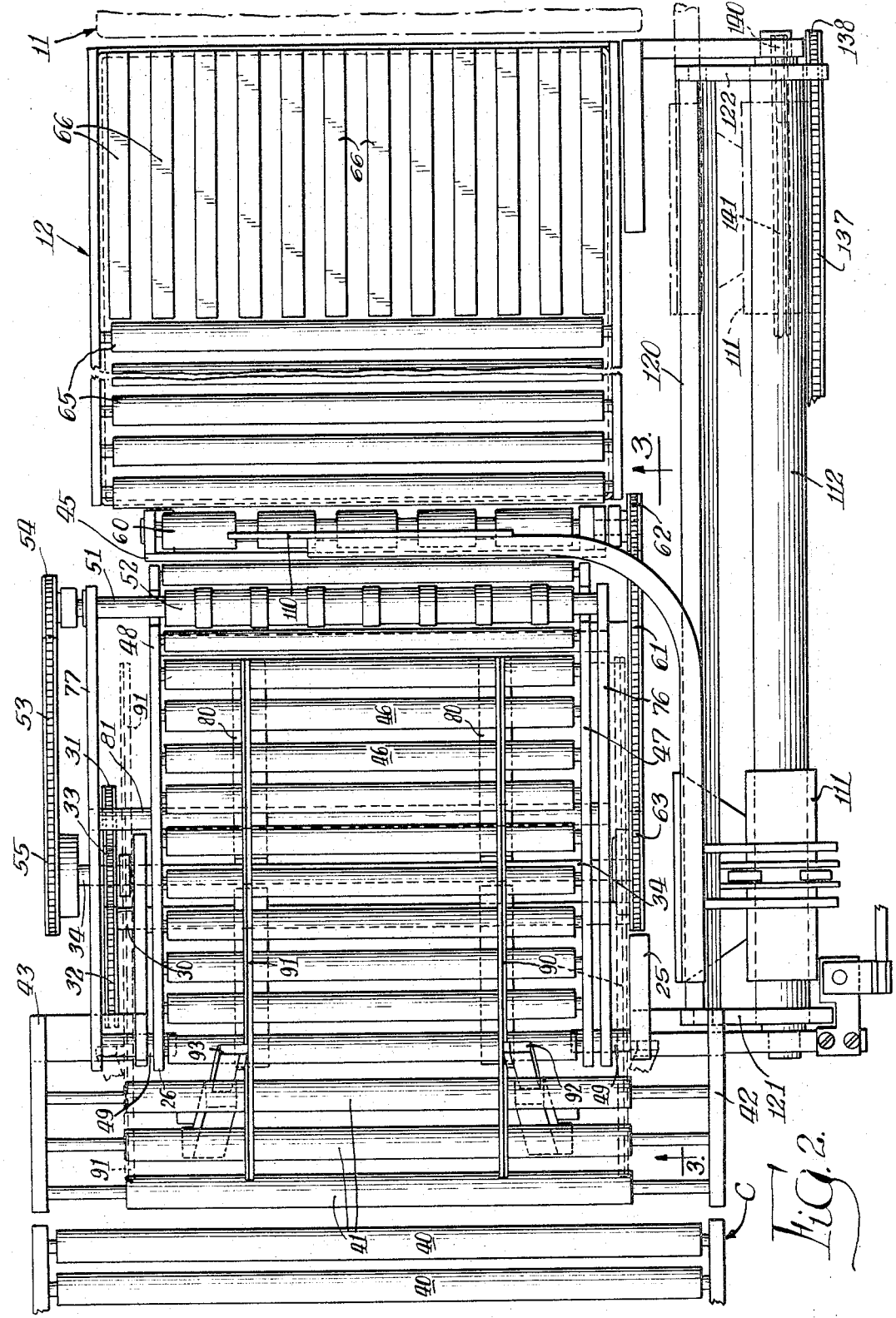

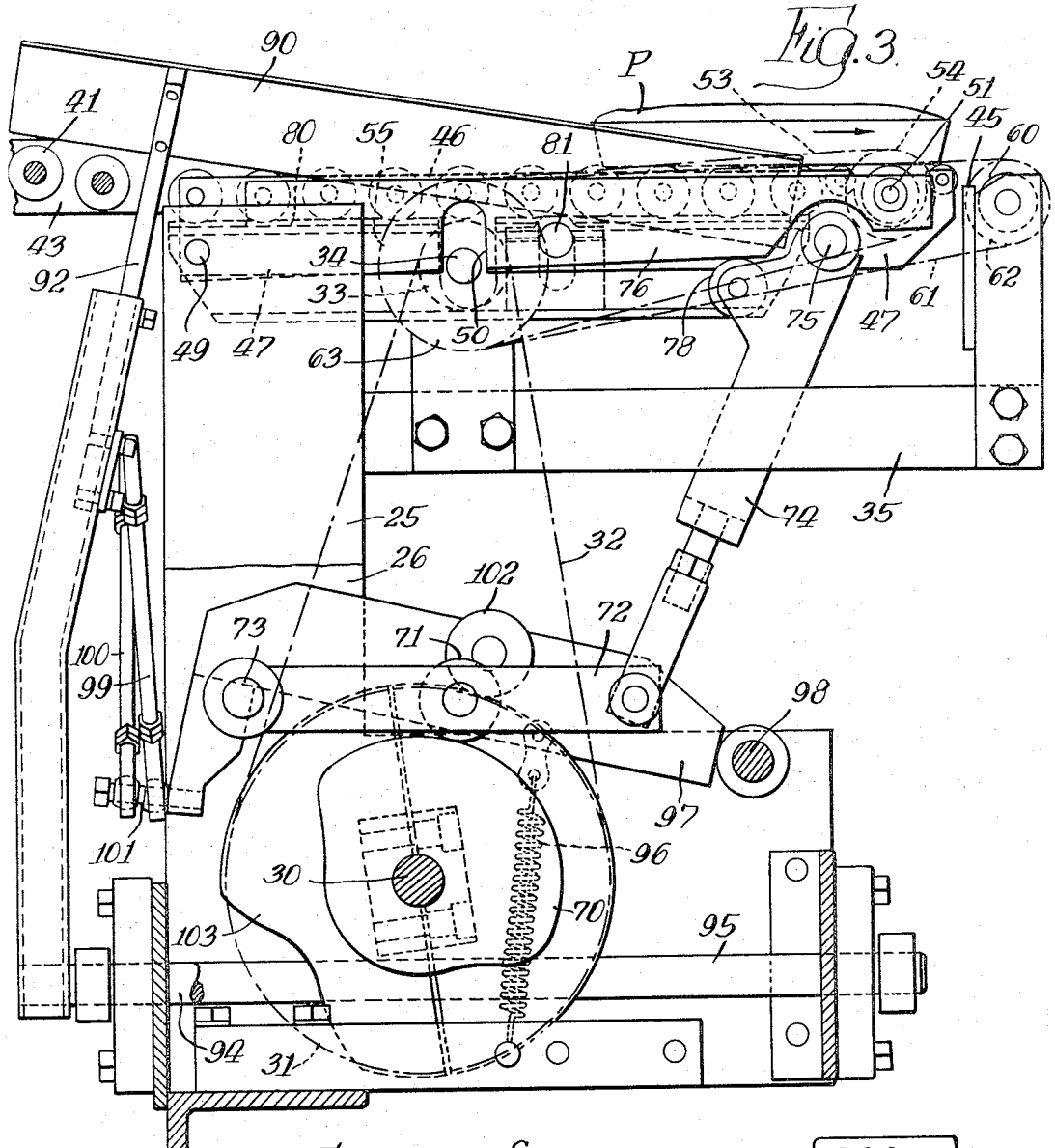
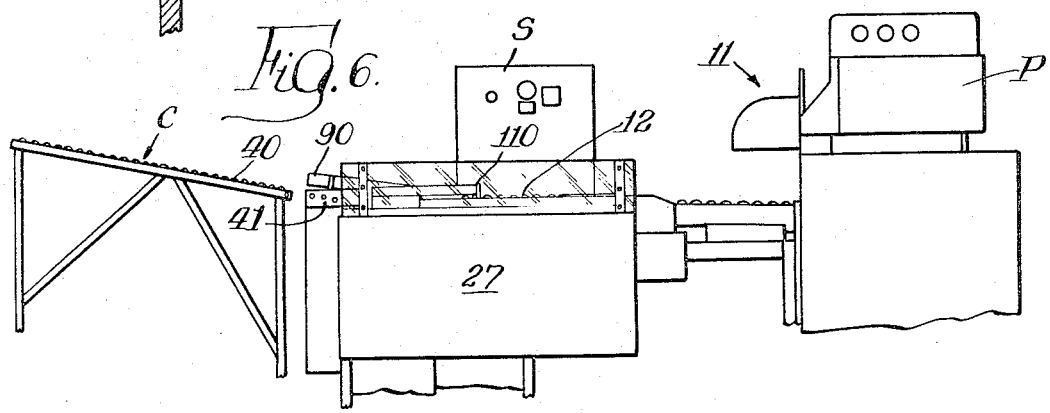

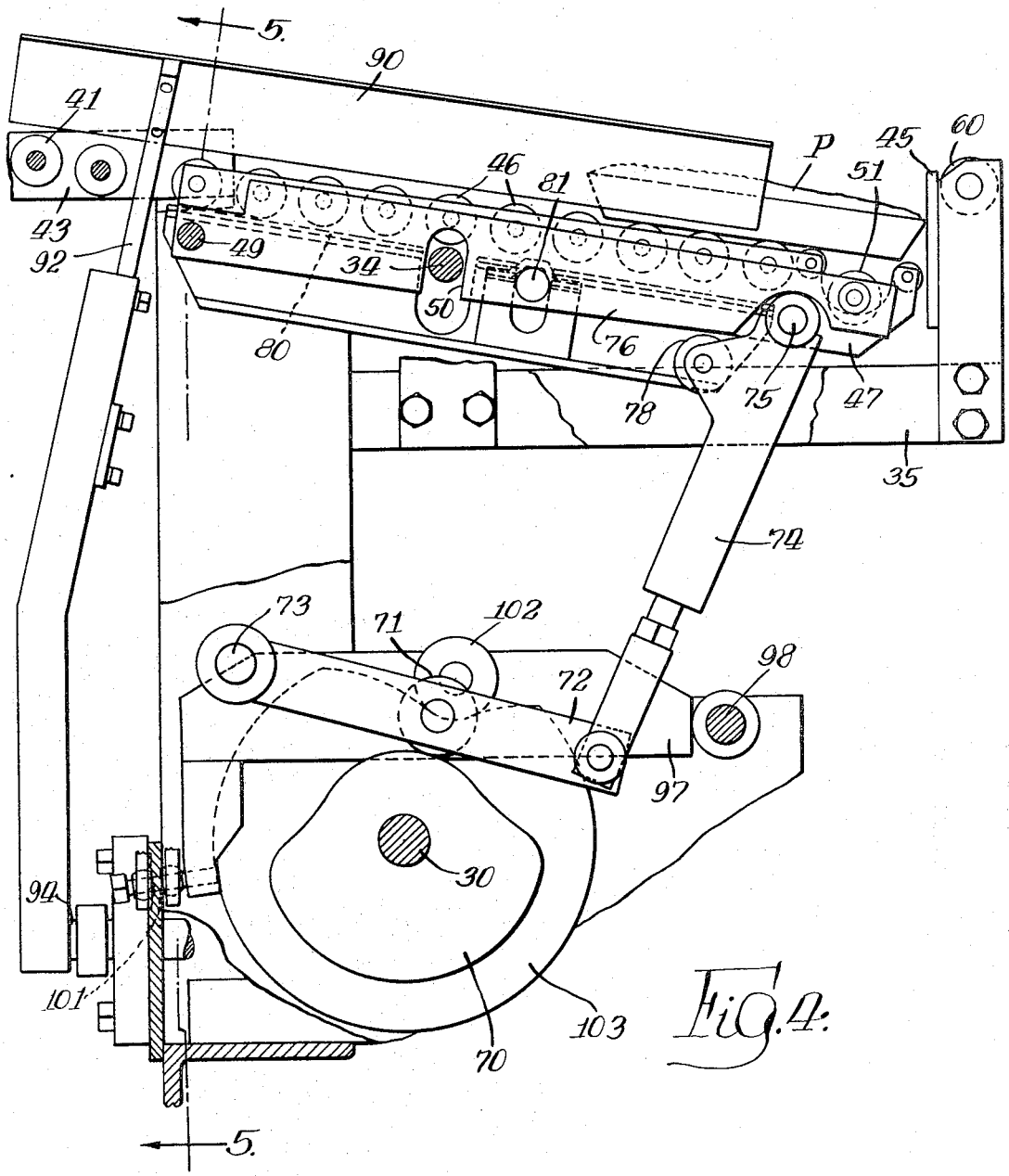

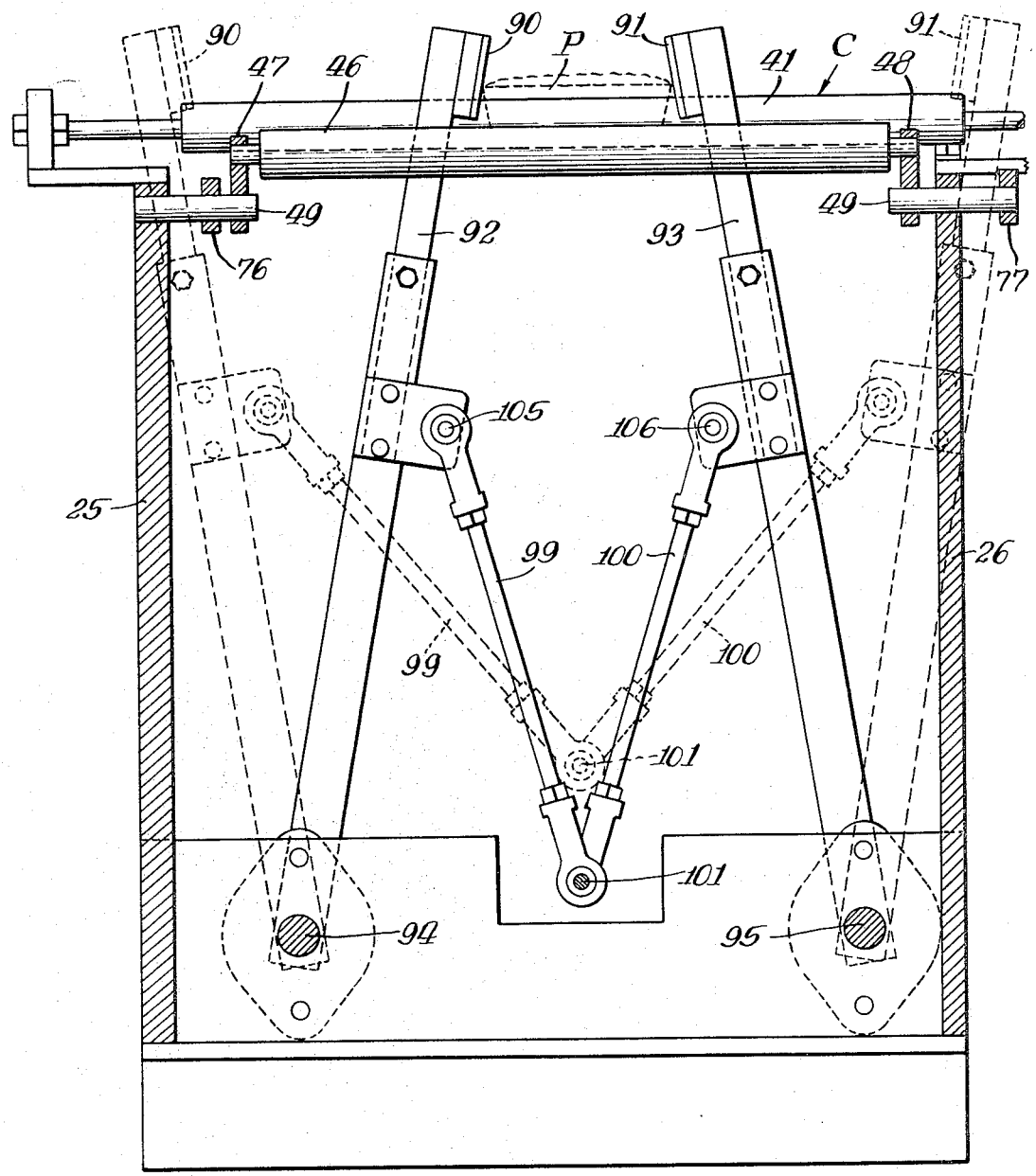

United States Patent Office 3,339,706
Patented Sept. 5, 1967

3,339,706
PACKAGE HANDLING MECHANISM
Bengt A. Arvidson, Villa Park, Ill., assignor to Corley-Miller, Inc., a corporation of Ohio
Filed Apr. 21, 1966, Ser. No. 544,151
7 Claims. (Cl. 198—34)

ABSTRACT OF THE DISCLOSURE

An apparatus having a package stop preceding a scale platform and with driving mechanism intermittently engageable with the package to move the package across the stop to the scale platform when the package is at a level above the stop.

---

This invention relates to package handling equipment and, more particularly, to package indexing devices for receiving packages at random from a source and for delivering them to a station in spaced-apart, timed sequence with new and improved results.

An object of this invention is to provide a new and improved package indexing device in which the packages are delivered from a random source in spaced-apart, timed sequence and a package is only engaged by powered conveying structure at such times as the package is to be moved.

Still another object of the invention is to provide a combination of package delivery means, package weighing scale, and package labelling mechanism in which packages ages are received from a source at random and are delivered to a weighing scale platform in separated, timed sequence for weighing and the packages are subsequently delivered to the labelling mechanism wherein the means for indexing packages includes structure for bringing successive packages against a fixed stop, elevating a package to a level above the fixed stop and at that time bringing a driven member into engagement with the package to move the package across the stop onto the scale platform, with the driven means out of engagement with the package at all other times.

A further object of the invention is to provide a package indexing device for obtaining spaced delivery of packages to a station, such as the platform of a weighing scale, comprising a package stop in advance of the station with means for advancing successive packages to said stop at a level to be blocked by the stop, means for elevating a blocked package to a raised level above the stop, and means for moving a package at the raised level across the stop including a continuously driven member which engages the package only when the package is at the raised level and at all other times is out of engagement with the package so as to not damage the package or wrapping material on the package.

Further objects and advantages will become apparent from the following detailed description taken in connection with the accompanying drawings in which:

FIG. 2 is a plan view of the structure shown in FIG. 1;

FIG. 3 is a vertical section, on an enlarged scale, taken generally along the line 3—3 in FIG. 2;

FIG. 4 is a view similar to FIG. 3 and showing a portion of the package indexing device in a lowered package-receiving position;

FIG. 5 is a vertical section, taken generally along the line 5—5 of FIG. 4; and

FIG. 6 is a diagrammatic perspective view of the combination of structures.

Figure 1:
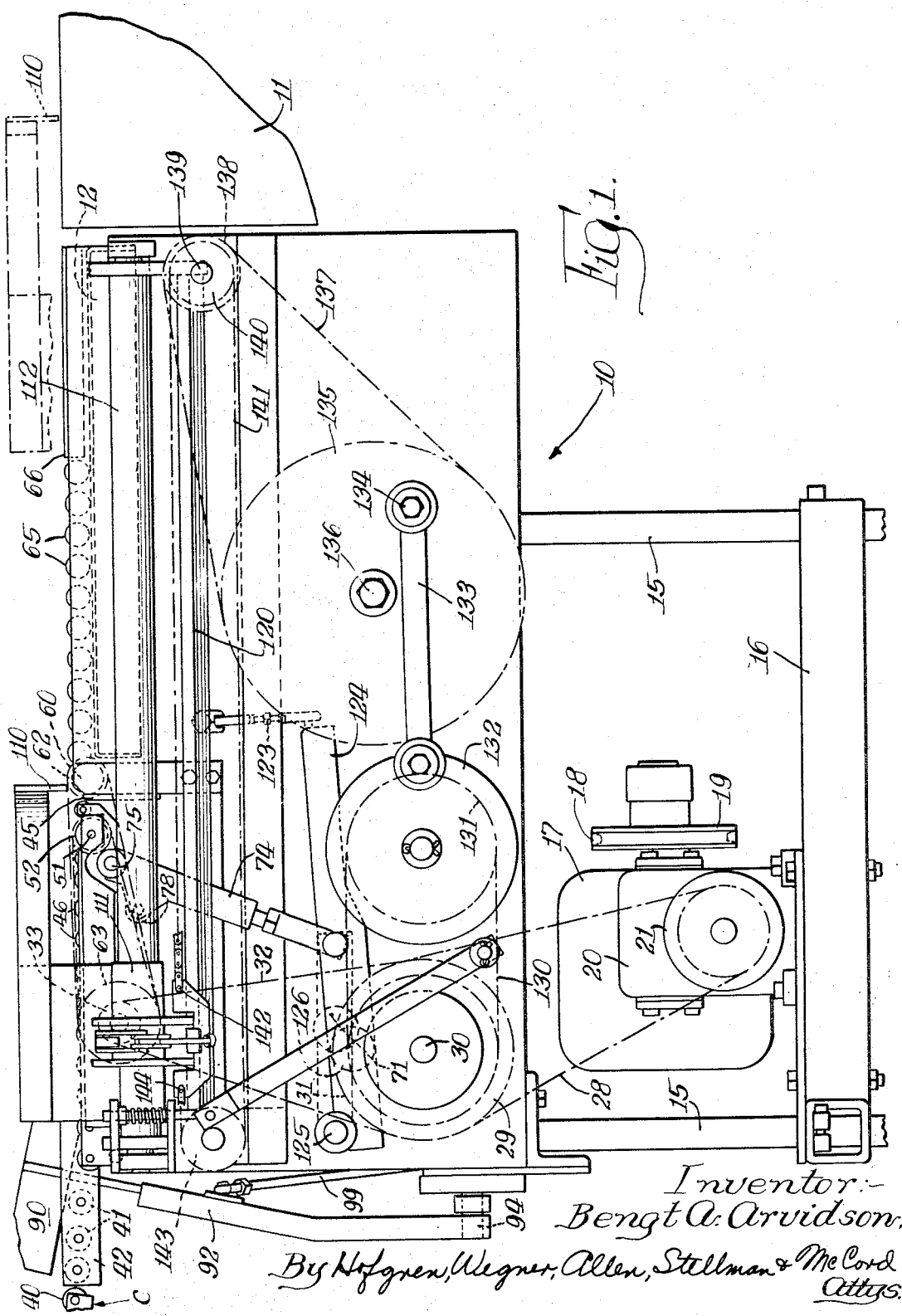
FIG. 1 is a front elevational view of the package indexing device in combination with a weighing scale platform and a package labelling mechanism.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown in FIGS. 1, 2 and 6, a package indexing device, indicated generally at 10, is positioned in advance of a scale S and a package labelling mechanism, indicated generally at 11, which may be of the type disclosed in the copending application of B. A. Arvidson and F. F. Treiber, Ser. No. 451,742, filed Apr. 29, 1965. The package indexing device is associated with a scale platform 12, shown in broken line in FIG. 1, which receives a package and the scale S having the platform reads the weight of the package, which is then used to operate a computer to have a printer P print a label indicating the weight and cost of the package, which is placed on a label delivered by the labelling mechanism 11 and applied to a package.

The package indexing device 10 receives packages from a source, such as a package wrapping machine or conveyor C, coming one after the other and sometimes in contact and then spaces the packages and delivers them in timed sequence to the scale platform 12. After an interval of time the package is advanced off the scale platform to the labeling mechanism 11 to have the proper label affixed thereto.

The package indexing device 10 comprises a base having upstanding legs 15 at the four corners thereof with a transverse horizontal lower platform 16 connected to the legs and mounting a prime mover in the form of an electric motor 17 which, through a belt 18, drives a pulley 19 on the input shaft of a speed reducer 20, with the speed reducer 20 having an output shaft mounting a drive sprocket 21.

A main frame for the indexing device is supported by the legs 15 and includes a front frame plate 25 and a rear frame plate 26, as shown in FIG. 2, with there being a front cover planel 27. A drive chain 28 extends upwardly from the drive sprocket 21 immediately to the rear of the cover plate 27 and drives a sprocket 29 on a drive shaft 30 extending between the plates 25 and 26 and outside the frame plate 26 at the rear of the machine. The drive shaft 30 has a drive sprocket 31 which drives a chain 32 extending upwardly about a sprocket 33 on a shaft 34 extending from front to rear of the machine and rotatably mounted on a pair of subframes, one of which is indicated at 35 in FIG. 3 and which are connected to the main frame of the machine. The driven shaft 34 is used to drive certain parts of the package indexing device, described subsequently.

In referring to FIGS. 1, 2, 3 and 6, packages can be received at random from the inclined conveyor C having freely-running rollers 40 or some other supply source, such as a wrapping machine, with the packages progressing onto freely running rollers 41 mounted between front and rear frame members 42 and 43, respectively. The packages are free to advance to a position to engage a fixed package stop 45 extending across the path of the packages and mounted to the sub-frame. A package P is shown engaging the package stop 45 in FIG. 4. A package reaches the package stop by the use of free-running rollers 46 extending between frame arms 47 and 48, located at the front and rear of the machine and pivoted on a fixed shaft 49 extending from front to rear in the machine. There is a series of the rollers 46 spanning the gap between the freely-running rollers 41 and the package stop 45. The rollers 46 can have a downhill disposition, as shown in FIG. 4, whereby a package can move therealong under the urging of gravity to a position to engage the package stop 45. As shown in FIG. 3, the rollers 46 and the supporting frame arms therefor can be elevated to a raised, generally horizontal position, in which a package P is located at a level above the package stop 45, whereby a package can be advanced across the stop and onto the scale platform 12. The arms 47 and 48 are each notched, as indicated at 50, whereby the arms can clear the shaft 34.

In initially supplying packages to the indexing device, the rollers 46 are in the position shown in FIG. 4, whereby a package can freely roll by gravity from the left end of the machine all the way down along the freely-running rollers 46 to have the leading package engage the package stop 45. When the rollers 46 are elevated to the position shown in FIG. 3, a positive drive for the package takes over to advance the package across the package stop and to the scale platform. This positive drive only engages the package when it is elevated to the position of FIG. 3 and is not in engagement with the package when the package is in the position shown in FIG. 4 whereby there can be no damage to the package from constant engagement by a continuous drive means.

This drive means comprises a drive roller 51 having a series of friction disks 52 about the roller engageable with a package. This roller is driven by a chain 53 engaging a sprocket 54 on the drive roller shaft and driven from a sprocket 55 on shaft 34 (FIG. 2). When a package P is advanced across the package stop 45 by the driven roller 51, the package will then be engaged by a second driven roller 60 positioned between the package stop and the scale platform 12. This roller is continuously driven in a direction to advance a package onto the scale platform by means of a drive chain 61 passing about a drive sprocket 62 on the shaft of roller 60 and a sprocket 63 on the shaft 34 at the front of the machine.

In order to insure proper location of a package on the scale platform 12, the platform is provided with a series of spaced, parallel, free-running rollers 65 at the entry side, which permit free advance of a package onto the scale platform, with there being a series of fixed friction bars 66 on the exit side of the scale platform which frictionally engage a package and prevent inadvertent movement of the package beyond the scale platform.

The means for moving the rollers 46 up and down and also the continuously driven roller 51 comprises a cam 70 on the cam shaft 30 coacting with a cam follower roller 71 mounted on a lever arm 72 of a linkage system, with the lever pivoted at 73 at one end thereof and at its other end to a generally vertically extending link 74 connected at its upper end by a pin 75 to the supporting frame arm 47 for the freely-running rollers 46. The driven roller 51 is mounted on a pair of arms 76 and 77 which also pivot about the shaft 49 for up and down movement. The link 74 has a roller 78 adjacent the upper end engaging with the underside of the roller supporting arm 76, so that as the rollers 46 are moved toward the position of FIG. 3, the driven roller 51 is elevated from a withdrawn position at a level beneath the top of rollers 46 to a position above the top of rollers 46 to engage the underside of the package P. In effect, the driven roller 51 moves a greater distance than the rollers 46, which is the result of the elevating movement of the link 74 and the action of the roller 78 engaging the arm 76 at a lesser distance from the pivot shaft 49 than the engagement of link 74 by pin 75 to the frame arms for the rollers 46. With this construction, the roller 51 will only engage and move a package P when the package P is in the raised position above the package stop 45.

When a package P is being advanced, as shown in FIG. 3, brake means are provided to make sure that a succeeding package cannot be moved along with the advancing package. With a series of packages in line on conveyor C and being urged by gravity towards the package stop 45, there could be advance of packages along rollers 46 unless they are braked. This brake structure comprises a pair of spaced, elongate brake pads 80 extending lengthwise underneath the free-running rollers 46 and intermediate their ends hanging on a shaft 81 extending between the support arms 76 and 77 for the shiftable drive roller 51. With the free-running rollers 46 in lowered position, as shown in FIG. 4, the brake pads 80 are out of engagement with the rollers and when the free-running rollers are raised to the position shown in FIG. 3, the brake pads 80 are in engagement with the rollers to prevent their rotation, so that the only movement of a package that can occur is that imparted to the leading package by the drive roller 51. The brake pads are brought into engagement with the rollers 46 because of the greater movement of shaft 81 and arms 76 and 77 than of the rollers and arms 47 and 48. Succeeding packages remain fixed on the braked rollers 46 until the rollers are lowered.

The cam 70 has a "high" of approximately 180° whereby, in one cycle of operation, the free-running rollers will be in the upper raised position for a major part of the cycle.

In order to center packages of varying sizes on the free-running rollers 46, a pair of paddles 90 and 91 extend to either side of the frame arms 47 and 48 whereby when the free-running rollers 46 are in their lower position, shown in FIG. 4, the paddles 90 and 91 can be moved inwardly toward each other to engage and center a package. This action is accomplished by having the paddles 90 and 91 mounted on the upper ends of a pair of arms 92 and 93 pivoted to the frame at their lower ends at 94 and 95, respectively. The arms 92 and 93 are operated yieldably by means of a spring 96 connected between the frame and a pivotally-mounted lever arm 97 pivoting about a pin 98 and extending to a location at an end of the machine where it connects at 101 to a pair of upwardly extending links 99 and 100. The lever arm 97 carries a cam follower roller 102 intermediate its ends which follows a cam 103 on the drive shaft 30.

When cam 70 causes the free-running rollers 46 to be in their downwardly inclined position of FIG. 4, the cam 103 presents its low to the cam follower 102 which permits the spring 96 to pull down on the lever 97 which lowers the links 99 and 100 which are pivoted at their upper ends to the arms 92 and 93 by pivot pins 105 and 106, respectively, to urge the paddles 90 and 91 from the broken line position, shown in FIG. 5, to the full line position in which a package P has been centered. In the event that one paddle reaches the package before the other, the package will be shifted, since the spring 96 is stronger the force required to laterally shift the package. However, when both the paddles are pressing against opposite ends of the package, no further movement will occur, because of the yieldable urging by spring 96. Subsequently, when the cam 103 presents its high to the follower 102, the paddles 90 and 91 will be moved outwardly to permit the free-running rollers 46 to be elevated to the position of FIG. 3. The paddle members 90 and 91 are in the retracted position shown in broken line in FIG. 5 for a major part of the machine cycle and only move in when the rollers 46 are lowered.

Means are provided operating in timed relation with the package indexing device to remove a package from the scale platform 12 and move it onto the package labelling mechanism 11. This means comprises a package pusher arm having two extreme limits of movement, shown in FIG. 6, wherein the arm 110 is in a fully retracted position, as shown at the left in full line in FIG. 2, and is in fully advanced position, as shown in broken line in FIG. 1. This arm is connected at an end to a collar 111 (FIG. 2) movable along a rod 112 extending along the front of the machine. In addition to back and forth movement, this arm oscillates up and down about the rod 112 so that the arm can be lowered in a lower position adjacent the scale platform as it moves from left to right, as viewed in FIG. 2 and then can elevate to a non-obstructing position with a package as it moves back from the broken line to full line position, shown in FIG. 6. The oscillating movement of the pusher 110 is obtained by having following mechanism extending from the collar 111 and engaging the upper and lower side of a guide bar 120 connected at its ends to a pair of arms 121 and 122 which are each pivoted at an end thereof to the frame so that the guide bar 120 can move up and down under the control of a link 123 connected to an arm 124 pivoted at 125 to the frame and having a cam follower roller 126 engageable with a cam (not shown) on shaft 30 to cycle the guide bar 120 up and down during a cycle of operation. The collar 111 is reciprocated along the guide rod 112 from the drive shaft 30 through a drive chain 130 engaging a sprocket 131 having a crank 132 which has a crank link 133 connected at 134 to a sprocket 135 rotatably mounted on a shaft 136. The sprocket 135 drives a chain 137 which passes about a sprocket 138 on a shaft 139 with this shaft having another sprocket 140 which drives a chain 141 connected at 142 to the collar 111 and also passing about an idler sprocket 143 and connecting to the opposite end of the collar, as indicated at 144. The rotation of crank 132 results in oscillation of sprocket 135 and the chains driven thereby.

In a circle of operation after a package P has been on the scale platform 12 for a predetermined time period, the pusher arm 110 moves across the scale to advance the package off the friction means 66 and into the package labelling mechanism 11. The pusher arm 110 oscillates to its upper position and returns to an intial position, while a package is being advanced by the drive roller 51 across the package stop 45 onto the scale platform 12.

I claim:
1. A package indexing device for obtaining spaced delivery of packages to a station having a scale platform comprising, a package stop in advance of said station, moving means for advancing successive packages to said stop at a level to be blocked by the stop, means for elevating a blocked package to a raised level above said stop, means for moving a package at the raised level across the stop including a continuously driven member, means for engaging the member with the package only when the package is at said raised level, said scale platform having a set of freely rotatable rollers rotatable about spaced parallel axes to permit free movement of a package onto the platform, and friction means on the platform engageable with an advanced package to prevent run-off of a package from the platform.

2. A combination as defined in claim 1 including means operable cyclically to engage a package on the platform and move the package across the friction means and off the platform.

3. A package indexing device as defined in claim 1 including means overlying said rollers to center a package adavancing toward said stop including a pair of spaced apart paddles extending transverse to the rollers, and means for yieldably moving the paddles toward each other to shift an off-center package on said rollers to a centered position.

4. A package indexing device for use with a weighing scale and package labelling mechanism to receive packages at random from a source such as a conveyor and deliver the packages one at a time in spaced apart timed sequence to a weighing scale platform comprising, a fixed package stop adjacent to and in advance of said platform, a pivotally mounted frame in advance of said package stop having a plurality of free running rollers, means for moving said frame between a downwardly inclined position in which a package can move by gravity on the rollers to engage the package stop and a raised generally horizontal position in which a package is on the rollers at a level above the package stop, a continuously driven roller adjacent staid stop, means for positioning said driven roller at a level beneath the free running rollers when a package is against the stop and for positioning said driven roller above the free running rollers when the package is above the stop to engage the package and advance the package across the stop and toward the platform, a second driven roller positioned between the stop and the platform to assist in advancing a package onto the platform, and the scale platform having rollers on a part thereof to facilitate movement of a package onto the platform and means adjacent the platform rollers to frictionally retard a package and hold it on the platform.

5. A package indexing device as defined in claim 4 wherein means operated in timed relation with said frame adavance a package off said platform against the action of said friction means.

6. A packaging indexing device as defined in claim 4 including brake means for said free running rollers to brake said rollers when the frame is in a raised position to hold back succeeding packages from advancing toward the stop until the frame moves to the downwardly inclined position.

7. A package indexing device for obtaining spaced delivery of a package to a station having a scale platform comprising, a package stop, moving means for advancing successive packages to said stop at a level to be blocked by the stop, means for changing the relative elevation of a package and the stop whereby the package can move past the stop, means intermittently operable to move a package across the stop, said scale platform having a set of conveying members to provide for movement of a package onto the platform, and friction means on the platform engageable with an advanced package to prevent run-off of a package from the platform.

References Cited
UNITED STATES PATENTS

| | | | |
|---|---|---|---|
| 2,633,972 | 4/1953 | Capstack | 198—39 |
| 2,794,534 | 6/1957 | Forrester | 198—34 |
| 2,986,262 | 5/1961 | Powers | 198—34 X |
| 3,058,564 | 10/1962 | Kubat | 198—35 |
| 3,083,780 | 4/1963 | Swenson | 198—39 X |
| 3,155,222 | 11/1964 | Stremke | 198—34 |

EVON C. BLUNK, *Primary Examiner.*

EDWARD A. SROKA, *Examiner.*